(12) United States Patent
Lee

(10) Patent No.: US 10,794,263 B2
(45) Date of Patent: Oct. 6, 2020

(54) THERMOSTAT FOR ENGINE COOLING SYSTEM

(71) Applicants: HYUNDAI MOTOR COMPANY, Seoul (KR); Kia Motors Corporation, Seoul (KR)

(72) Inventor: Hyo-Jo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/685,079

(22) Filed: Nov. 15, 2019

(65) Prior Publication Data

US 2020/0182128 A1 Jun. 11, 2020

(30) Foreign Application Priority Data

Dec. 11, 2018 (KR) .................... 10-2018-0159177

(51) Int. Cl.
| | |
|---|---|
| F01P 7/14 | (2006.01) |
| F01P 7/16 | (2006.01) |
| F01P 3/18 | (2006.01) |
| F16K 31/00 | (2006.01) |

(52) U.S. Cl.
CPC ........ *F01P 7/16* (2013.01); *F01P 3/18* (2013.01); *F16K 31/002* (2013.01); *F01P 2007/146* (2013.01); *F01P 2060/04* (2013.01); *F01P 2060/08* (2013.01)

(58) Field of Classification Search
CPC ........ F01P 7/16; F01P 2007/146; F01P 7/165; G05D 23/022; G05D 23/1852; G05D 23/02; F16K 31/002

USPC .................................................... 123/41.1
See application file for complete search history.

(56) References Cited

U.S. PATENT DOCUMENTS

| | | | |
|---|---|---|---|
| 10,125,663 B2 * | 11/2018 | Arbel ................ | G05D 23/1333 |
| 2004/0026521 A1 * | 2/2004 | Colas ................. | F01P 7/167 |
| | | | 236/34.5 |
| 2014/0182522 A1 | 7/2014 | Lee et al. | |
| 2016/0053911 A1 * | 2/2016 | Klein .................. | F16K 31/02 |
| | | | 137/625.45 |
| 2017/0175613 A1 * | 6/2017 | Poisson ............... | G05D 23/022 |
| 2019/0153927 A1 * | 5/2019 | Inoue .................. | F01P 7/165 |

FOREIGN PATENT DOCUMENTS

KR        10-1371492 B1       3/2014

* cited by examiner

*Primary Examiner* — Long T Tran
*Assistant Examiner* — James J Kim
(74) *Attorney, Agent, or Firm* — Morgan, Lewis & Bockius LLP

(57) ABSTRACT

A thermostat for an engine cooling system may include a housing comprising a radiator-side flowing-in inlet for flowing-in coolant from a radiator side, a bypass-side flowing-in inlet for flowing-in the coolant bypassed from an engine, and a coolant flowing-out outlet for flowing-out the coolant to the engine side; and a main valve provided in the housing, and for opening and closing the radiator-side flowing-in inlet by a change in the volume of a wax. The direction in which the coolant flowed-in through the radiator-side flowing-in inlet presses the main valve and the direction operated to open the main valve are opposite to each other.

8 Claims, 5 Drawing Sheets

THERMOSTAT FOR ENGINE COOLING SYSTEM

CROSS-REFERENCE TO RELATED APPLICATION

This application claims priority to Korean Patent Application No. 10-2018-0159177, filed on Dec. 11, 2018, which is incorporated herein by reference in its entirety.

BACKGROUND OF THE DISCLOSURE

Field of the Disclosure

The present disclosure relates to a thermostat for use in a vehicle engine cooling system.

Description of Related Art

In vehicles, a thermostat is used in an engine cooling system for controlling coolant flow based on the temperature of coolant. In one implementation, the thermostat controls a bypass flow rate and a radiator flow rate that circulate inside the engine system. Mechanical thermostats or electrical thermostat may be used. However, mechanical thermostats cannot perform a variable control considering engine conditions and environmental factors. On the other hand, electronic thermostats can control a flow rate of coolant by adjusting the opening or the closing thereof depending on the operating conditions of the engine and the environmental factors. Korean Registered Patent 10-1371492 discloses the related technologies.

The contents described in Description of Related Art are to help the understanding of the background of the present disclosure, and can include what is not previously known to those skilled in the art to which the present disclosure pertains.

SUMMARY OF THE DISCLOSURE

One aspect of the present disclosure is to provide a thermostat for an engine cooling system, which can smoothly circulate coolant by preventing a valve from being opened by a differential pressure even when being applied to an engine inlet side. Another aspect provides a thermostat for use in a vehicle engine cooling system and is opened or closed based on a coolant temperature.

A thermostat for an engine cooling system according to a further aspect of the present disclosure includes a housing including a radiator-side flowing-in inlet for flowing-in coolant from a radiator side, a bypass-side flowing-in inlet for flowing-in the coolant bypassed from an engine, and a coolant flowing-out outlet for flowing-out the coolant to the engine side and a main valve provided in the housing, and for opening and closing the radiator-side flowing-in inlet by a change in the volume of a wax, and the direction in which the coolant flowed-in through the radiator-side flowing-in inlet presses the main valve and the direction operated to open the main valve are opposite to each other.

Herein, the main valve is a state of closing the radiator-side flowing-in inlet in a state where the wax has not been changed in volume.

More specifically, the thermostat for the engine cooling system can further include a first piston coupled to the wax to move by the change in the volume of the wax, and coupled to one surface of the main valve and a main valve spring having one side elastically supporting the other surface of the main valve to apply an elastic restoring force thereto in a direction parallel with the moving direction of the first piston.

Then, the other side of the main valve spring is coupled to the housing side.

In addition, the thermostat for the engine cooling system can further include a bypass valve provided in the housing, and for opening and closing the bypass-side flowing-in inlet by the change in the volume of the wax.

Herein, the direction in which the coolant flowed-in through the bypass valve presses the bypass valve and the direction operated to close the bypass valve are opposite to each other.

Then, the bypass valve is a state of opening the bypass-side flowing-in inlet in a state where the wax has not been changed in volume.

Furthermore, the thermostat for the engine cooling system can further include a second piston coupled to the wax to move by a change in the volume of the wax, and coupled to one surface of the bypass valve and a bypass valve spring coupled to one surface of the bypass valve to apply an elastic restoring force toward the wax side to the bypass valve.

The thermostat according to the present disclosure is not opened by the differential pressure of the coolant even when being applied to the engine inlet side in the engine cooling system.

Therefore, it is not necessary to increase the size of the bypass hole or to increase the flow rate, thereby smoothly supplying the coolant.

In addition, it is influenced only by the coolant temperature without being influenced by the engine operation and the external environment, thereby further improving reliability and improving durability.

DESCRIPTION OF EMBODIMENTS

In order to fully understand the present disclosure, operational advantages of the present disclosure, and aspects and features achieved by the practice of the present disclosure, embodiments are discussed below with reference to the accompanying drawings.

In describing embodiments of the present disclosure, a description of known or repeated descriptions that can unnecessarily obscure the subject matter of the present disclosure will be reduced or omitted.

Figure 1:
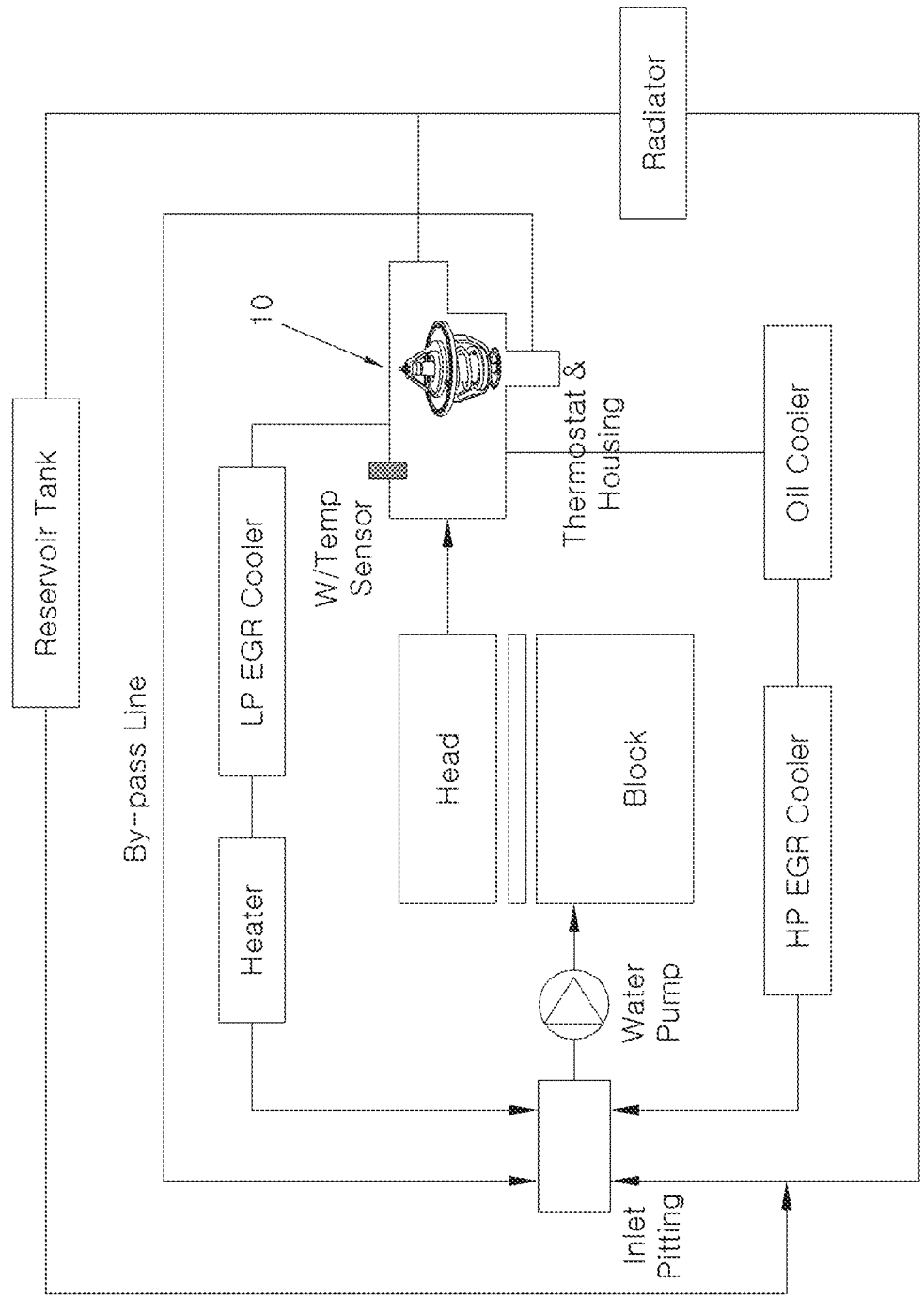
FIG. 1 is a diagram schematically illustrating an outlet control type engine cooling system.

In one implementation of an engine cooling system shown in FIG. 1, a thermostat 10 is applied to the engine cooling system and controlled to be opened or closed based on the coolant temperature that has been set. The thermostat controls a bypass flow rate and a radiator flow rate that circulate inside the engine.

A mechanical thermostat among the thermostats cannot perform a variable control considering engine conditions and environmental factors. An electronic thermostat or electric thermostat can control a flow rate of coolant by adjusting the opening or the closing thereof depending on the operating conditions of the engine and the environmental factors.

In one implementation, the electronic thermostat controls a coolant temperature so that there is no problem in durability of the engine in a high load condition, and controls the coolant at a high temperature considering fuel efficiency and performance improvement of the engine in a low load range.

Figure 2:
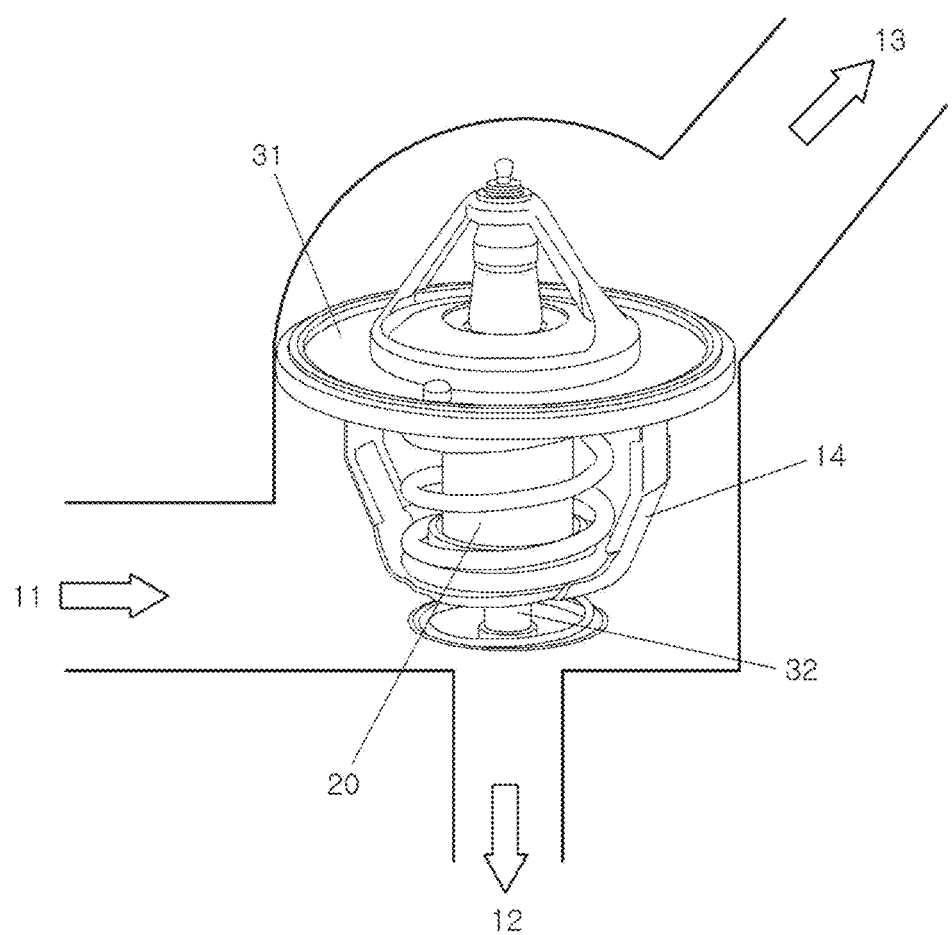
FIG. 2 is a diagram schematically illustrating a thermostat applied to FIG. 1.

FIG. 2 is a diagram illustrating an example of a mechanical thermostat 10, which controls the coolant flowed-in from a coolant flowing-in inlet 11 to a bypass line 12 or a radiator side 13, opens and closes a passage of the radiator side 13 by a main valve 31 supported on a bracket 14 based on a change in the volume of a wax 20 depending on a temperature, and opens and closes the bypass line 12 by a bypass valve 32. However, such a mechanical thermostat may be able to control only the bypass flow rate and the radiator flow rate.

Figure 3:
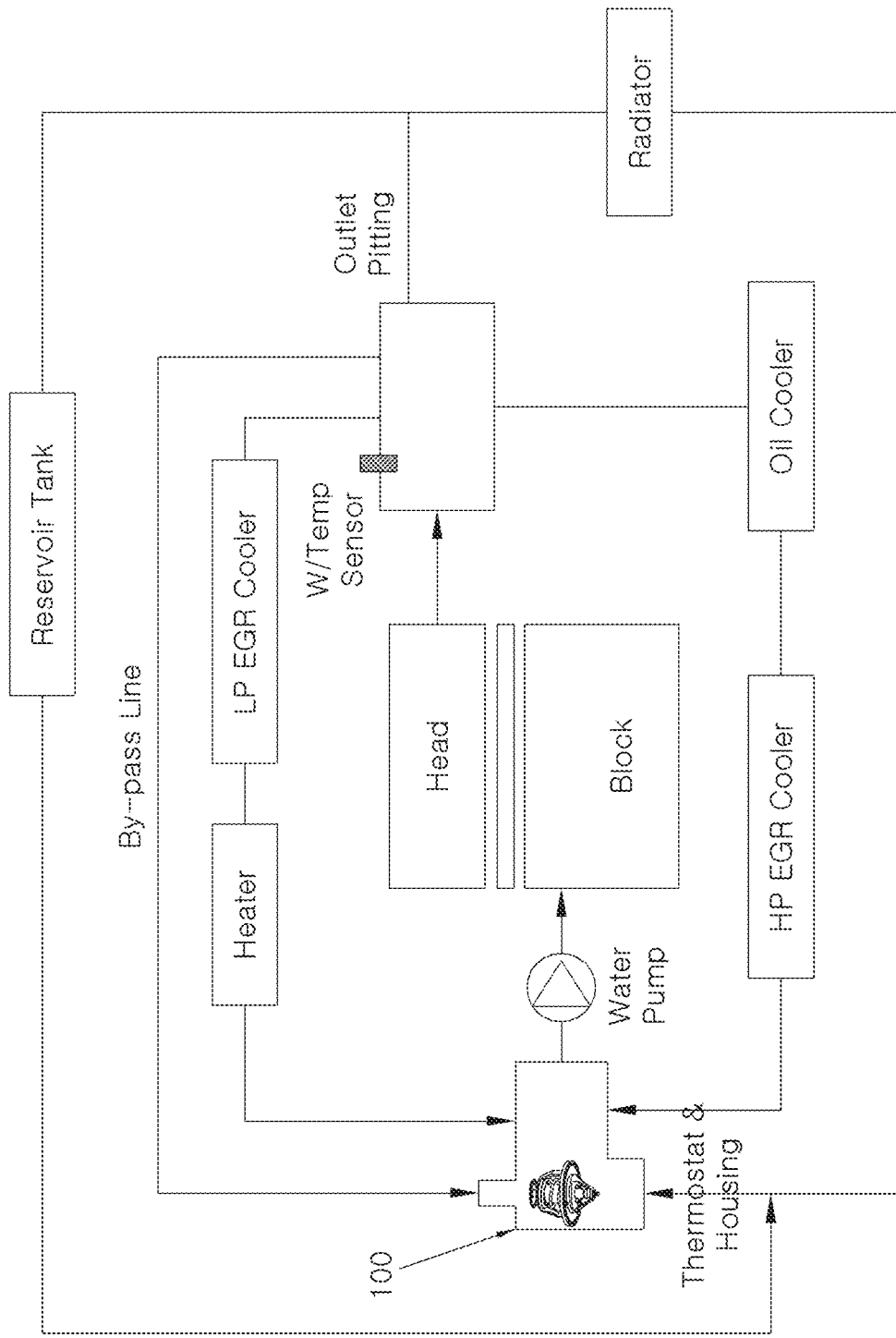
FIG. 3 is a diagram schematically illustrating an inlet control type engine cooling system.

FIG. 1 is a diagram illustrating an outlet control type cooling system in which a thermostat is mounted at an engine outlet side, and FIG. 3 is a diagram illustrating an inlet control type cooling system in which a thermostat is mounted at an engine inlet side.

Since the flow of coolant is different depending on a difference in such cooling types, the pressure applied to the thermostat is changed.

Figure 4:
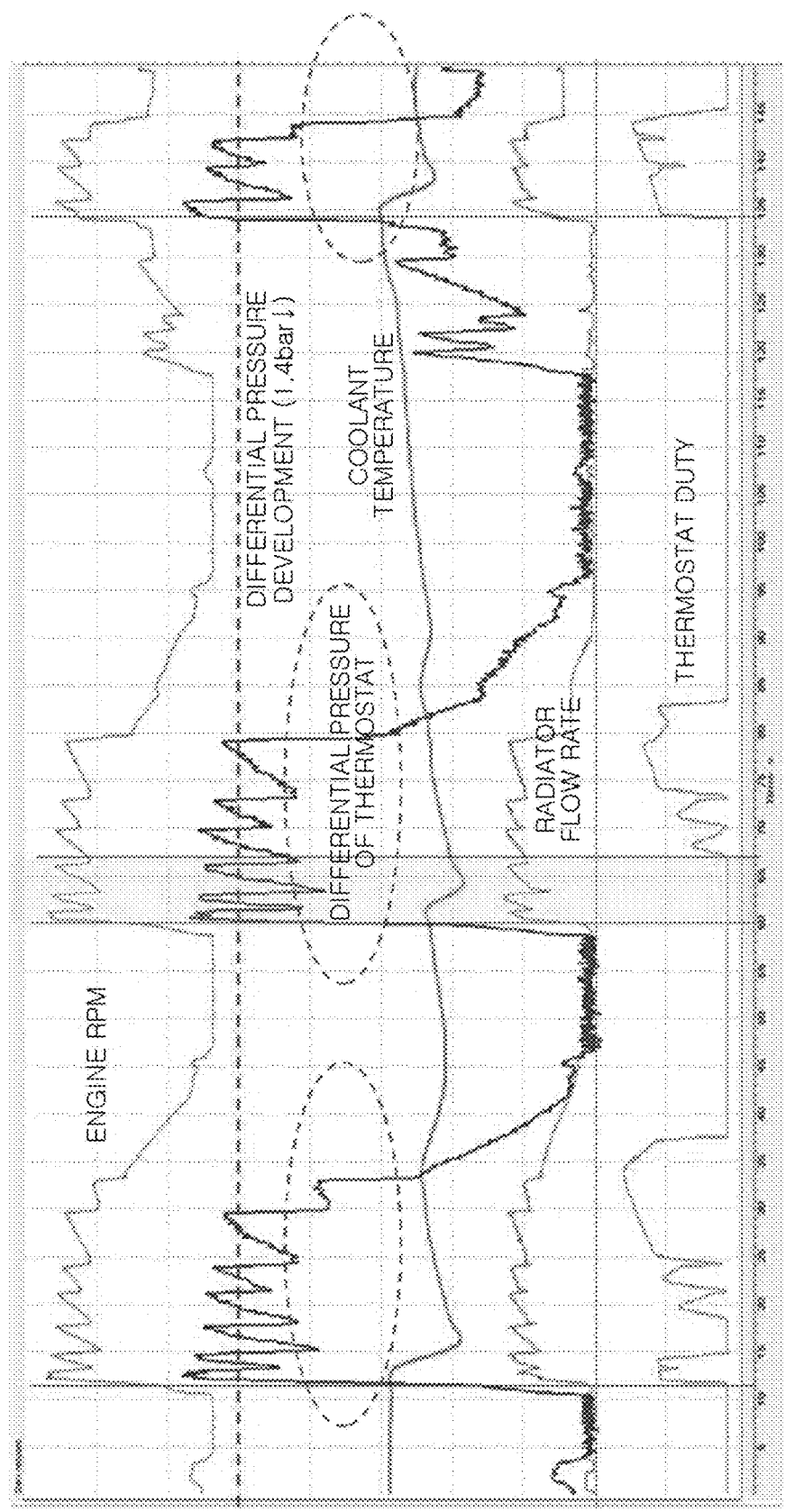
FIG. 4 is a diagram illustrating a differential pressure evaluation result of the thermostat.

The outlet control type of FIG. 1 has a structure in which a valve cannot be opened by the pressure depending on the flow of coolant, but the inlet control type as in FIG. 3 opens the thermostat when the pressure (differential pressure) is large. It can be seen in FIG. 4 that the thermostat is opened by the differential pressure of the coolant. For example, in the region of 3,500 rpm or more, the radiator flow rate is generated based on an increase in the differential pressure (1.4 bar or more) of the thermostat, thereby causing a heating performance failure.

Therefore, in order to prevent or avoid the foregoing, it may be necessary to increase the bypass flow rate to relieve the pressure, but as a result, when the bypass flow rate is increased, a warm-up delay occurs and the flow rate flowing to a heater, an oil cooler, an EGR cooler, etc. becomes small.

Figure 5:
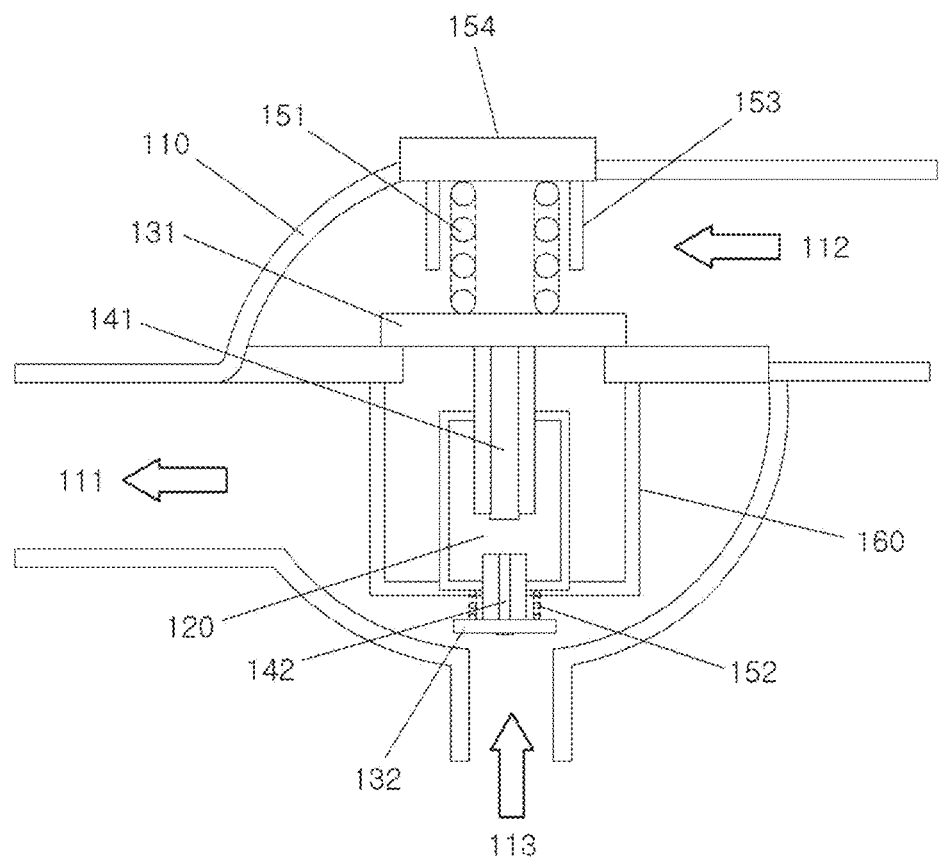
FIG. 5 is a diagram schematically illustrating the cross-sectional shape of the thermostat for the engine cooling system according to the present disclosure.

FIG. 5 is a diagram schematically illustrating the cross-sectional shape of the thermostat for the engine cooling system according to the present disclosure. Hereinafter, the thermostat for the engine cooling system according to an embodiment of the present disclosure will be described with reference to FIG. 5.

The thermostat for the engine cooling system according to the present disclosure is a thermostat applied to an inlet control type engine cooling system as in FIG. 3.

In an embodiment, the thermostat for the engine cooling system is provided at the front end of an engine or a water pump for the engine cooling system to control the direction and the flow rate of coolant based on a coolant temperature, and is to prevent or inhibit a valve from being opened by a differential pressure of the coolant even when being provided at the front end of the engine unlike a typical thermostat.

For this purpose, the thermostat controls the passage and the flow rate of the coolant by driving a main valve 131 and a bypass valve 132 that are supported by a bracket 160 by a change in the volume of a wax 120 in a housing 110.

A radiator-side flowing-in inlet 112, a bypass-side flowing-in inlet 113, and a coolant flowing-out outlet 111 are formed in the housing 110.

The heated coolant is cooled at the radiator and flowed-in through the radiator-side flowing-in inlet 112, the coolant is again flowed-in from the engine outlet through a bypass line separately from the radiator side through the bypass-side flowing-in inlet 113, and the coolant flowing-out outlet 111 is a line through which the coolant is flowed out to a water pump side.

The main valve 131 is disposed to open and close the radiator-side flowing-in inlet 112, and is vertically operated or moved by a first piston 141 moving together with the wax 120 by the change in the volume of the wax 120 in the bracket 160 to open and close the radiator-side flowing-in inlet 112.

In embodiments, a plate 154 is provided at the upper side of the housing 110, a main valve spring 151 elastically supports between the plate 154 and the upper side of the main valve 131, and the circumference of the main valve spring 151 is supported by a main valve spring guide 153 extended downwardly from the plate 154.

As shown in FIG. 5, in embodiments, the main valve 131 becomes a state of covering the bracket 160 in a state where there is no change in the volume of the wax 120 because the coolant temperature does not become a certain value or more, thereby closing the passage from the radiator-side flowing-in inlet 112 to the coolant flowing-out outlet 111.

On the other hand, when the wax 120 is changed in volume and the main valve 131 rises together with the first piston 141, the passage from the radiator-side flowing-in inlet 112 to the coolant flowing-out outlet 111 is opened.

Next, the bypass valve 132 is disposed to open and close the bypass-side flowing-in inlet 113, and is vertically operated or moved by a second piston 142 moving together with the wax 120 by the change in the volume of the wax 120 in the bracket 160 to open and close the bypass-side flowing-in inlet 113.

In embodiments, a bypass valve spring 152 elastically supports between the one side of the bypass valve 132 and the lower side of the bracket 160.

As shown in FIG. 5, the bypass valve 132 is in a state of opening the bypass-side flowing-in inlet 113 when there is no change in the volume of the wax 120 because the coolant temperature does not become a certain value or more. When the wax 120 is changed in volume as the coolant temperature increases, the bypass valve 132 descends together with the second piston 142, thereby closing the bypass-side flowing-in inlet 113.

As described above, the thermostat of the present disclosure has a structure in which the main valve 131 does not open the radiator-side flowing-in inlet 112 by the differential pressure therebetween even when the pressure of the coolant flowed-in the radiator-side flowing-in inlet 112 is large.

In an embodiment illustrated in FIG. 5, the direction in which the coolant is flowed-in through the radiator-side flowing-in inlet 112 to apply pressure to the main valve 131 and the direction operated to open the main valve 131 are opposite to each other.

The above-described vertical direction, the upper side, and the lower side are defined for convenience, and the up and down of the cooling system can differ from those described above.

As described above, a thermostat according to embodiments of the present disclosure opens the valve only depending on the coolant temperature, thereby preventing or inhibiting the thermostat from being opened by the differential pressure of the coolant in the low temperature and high speed sections.

Therefore, it is possible for cold coolant to circulate the engine, thereby preventing heating performance from deteriorating, or preventing the warm-up from being delayed, preventing performance from being reduced, etc.

As described above, while the present disclosure has been described with reference to the drawings, it is not limited to the described embodiments, and it is to be understood by those skilled in the art that various modifications and deformations can be made without departing from the spirit and the scope of the present disclosure. Therefore, the modified examples or the deformed examples should be included in the claims of the present disclosure, and the scope of the present disclosure should be construed based on the appended claims.

What is claimed is:

1. A thermostat for an engine cooling system, comprising:
    a housing comprising a radiator-side flowing-in inlet for receiving coolant flowing from a radiator, a bypass-side flowing-in inlet for receiving the coolant bypassed from an engine, and a coolant flowing-out outlet for discharging the coolant to the engine;
    a wax chamber disposed in the housing; and
    a main valve provided in the housing, wherein the main valve is configured to be open for allowing the coolant received through the radiator-side flowing-in inlet to the coolant flowing-out outlet, and further configured to be closed for blocking the coolant from the radiator-side flowing-in inlet from flowing to the coolant flowing-out outlet, wherein the main valve is configured to be opened and closed by a change of the volume of wax contained the wax chamber,
    wherein the main valve is configured to move in a first direction to be opened for allowing the coolant received through the radiator-side flowing-in inlet to flow out through the coolant flowing-out outlet, and the coolant from the radiator-side flowing-in inlet is configured to press the main valve in a second direction which is opposite to the first direction.

2. The thermostat for the engine cooling system of claim 1, wherein the main valve is configured to keep closed when the wax has not been changed in volume.

3. The thermostat for the engine cooling system of claim 1, further comprising:
    a first piston coupled to the main valve and configured to move in the first direction when the volume of the wax increases; and
    a main valve spring configured to elastically push the main valve in the second direction.

4. The thermostat for the engine cooling system of claim 3, wherein the main valve spring is supported by a wall of the housing.

5. The thermostat for the engine cooling system of claim 3, further comprising a bypass valve provided in the housing, wherein the bypass valve is configured to be open for allowing the coolant received through the bypass-side flowing-in inlet to the coolant flowing-out outlet, and further configured to be closed for blocking the coolant from the bypass-side flowing-in inlet from flowing to the coolant flowing-out outlet, wherein the bypass valve is configured to be opened and closed by the change of the volume of wax contained the wax chamber.

6. The thermostat for the engine cooling system of claim 5, wherein the bypass valve is configured to move in a third direction to be closed for blocking the coolant received through the bypass-side flowing-in inlet from flowing out through the coolant flowing-out outlet, and the coolant from the bypass-side flowing-in inlet is configured to press the bypass valve in a fourth direction which is opposite to the third direction.

7. The thermostat for the engine cooling system of claim 6, wherein the bypass valve is configured to keep open when the wax has not been changed in volume.

8. The thermostat for the engine cooling system of claim 5, further comprising:
    a second piston coupled to the bypass valve and configured to move in the third direction when the volume of the wax increases; and
    a bypass valve spring configured to apply an elastic force to the bypass valve in the fourth direction.

* * * * *